(12) United States Patent
Raasakka

(10) Patent No.: US 6,910,733 B2
(45) Date of Patent: Jun. 28, 2005

(54) RESILIENT WIND DEFLECTOR

(75) Inventor: John Paul Raasakka, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/719,524

(22) Filed: Nov. 21, 2003

(65) Prior Publication Data

US 2005/0110305 A1    May 26, 2005

(51) Int. Cl.⁷ .................................................. B60J 7/22
(52) U.S. Cl. ..................................................... 296/217
(58) Field of Search ......................................... 296/217

(56) References Cited

U.S. PATENT DOCUMENTS

| 3,904,239 A | 9/1975 | Jardin |
| 4,113,302 A | 9/1978 | Bos |

*Primary Examiner*—Dennis H. Pedder
(74) *Attorney, Agent, or Firm*—Carlson, Gaskey & Olds

(57) ABSTRACT

A wind deflector assembly includes a resilient member which extends above the vehicle roof when in the deployed position so as to operate as a wind deflector. The resilient member deploys due to the flexibility of the material such that the free state is the deployed condition. Operation of the closure member collapses or folds over the resilient member from the deployed free state to a collapsed state.

14 Claims, 2 Drawing Sheets

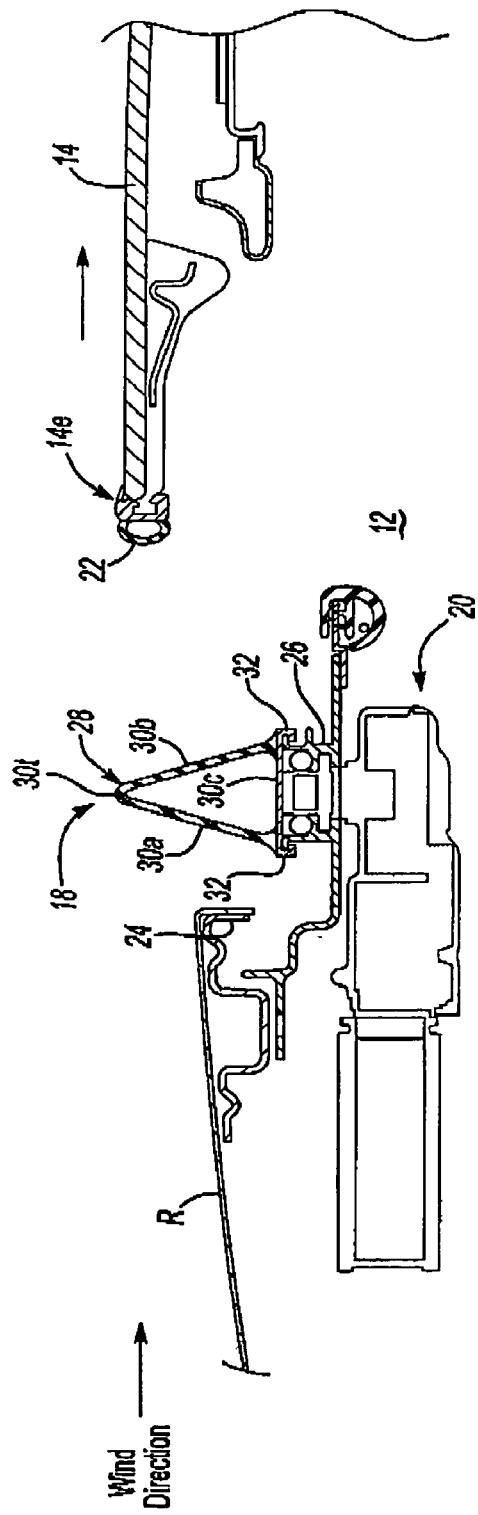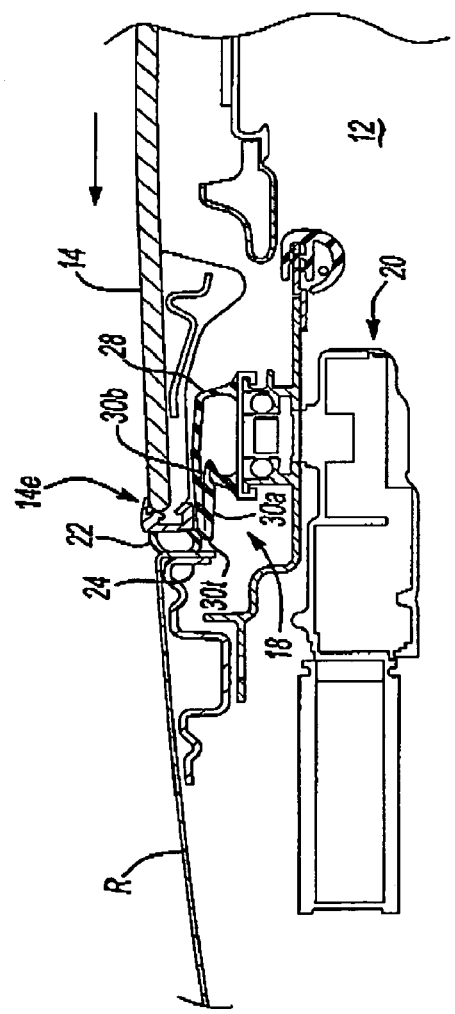

RESILIENT WIND DEFLECTOR

BACKGROUND OF THE INVENTION

The present invention relates to a vehicle sun roof, and more particularly to a resilient wind deflector therefore.

Conventional vehicle sunroofs often include a wind deflector to minimize drafts and noises caused by wind when driving with the sunroof fully or partially open. Due to limited packaging space, conventional wind deflectors are movable rigid shields which require pivots, arms and spring biases to operate.

Typically, when the sun roof is opened a spring bias extends the wind deflector above the roof line. When the sunroof is retracted, the movable sunroof portion overcomes the spring bias to retract the wind deflector. Other actively driven wind deflectors are also known.

Although effective, conventional wind deflectors are relatively complicated and expensive assemblies. The components which permit extension and retraction of the wind deflector are primarily arranged beneath the leading edge of the sunroof opening. This housing may be relatively deep and reduce the ceiling height of the vehicle. In addition, the wind deflector may actually momentarily increase wind noise when deploying due to the flow transition from the flat roof to the extending wind deflector.

Accordingly, it is desirable to provide an inexpensive and uncomplicated wind deflector which extends rapidly and requires minimal space.

SUMMARY OF THE INVENTION

The wind deflector assembly according to the present invention includes a wind deflector frame member which mounts a resilient member within a path of the closure member. The resilient member extends above the vehicle roof when in a deployed position so as to operate as a wind deflector. The resilient member is manufactured of a flexible material such as rubber or closed cell foam. The resilient member deploys due to the flexibility of the material in that the free state is the deployed condition. Operation of the closure member collapses or folds over the resilient member from the deployed free state to a collapsed or retracted state.

The present invention therefore provides an inexpensive and uncomplicated wind deflector which extends rapidly and requires minimal space.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is a sectional view taken along line A—A in FIG. 1 of a wind deflector in a first position; and FIG. 3 is a sectional view taken along line A—A in FIG. 1 of a wind deflector in a second position.

DETAILED DESCRIPTION OF THE PREFERRED EMBODIMENT

Figure 1:
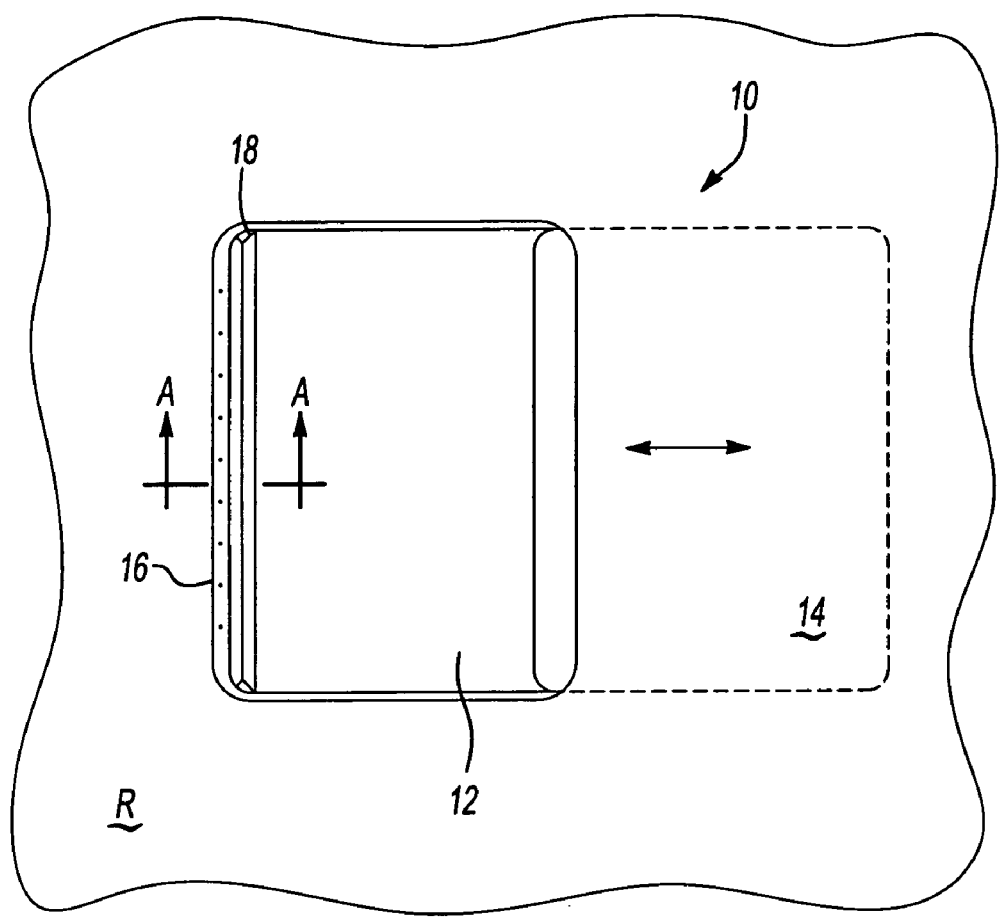
FIG. 1 is a general plan view of a vehicle roof with a sun-roof therein for use with the present invention.

FIG. 1 illustrates a top view of a sunroof assembly 10. The sunroof assembly 10 includes a roof opening 12 within a vehicle roof (illustrated schematically at R) and a closure member 14 which selectively exposes and closes the opening 12 in response to a drive and control arrangement (not shown) in a known manner. It should be understood that various panels which open when vehicle is moving will benefit from the present invention.

Along a leading edge 16 of the roof opening 12 a wind deflector assembly 18 selectively extends above the vehicle roof R (FIGS. 2 and 3) to deflect the slip-stream and minimize wind flow into the vehicle when the closure member 14 is open.

Referring to FIG. 2, the closure member 14 is illustrated in an open position. That is, the opening 12 is closed by closure member 14 (FIG. 3). A closure member frame 20 movably supports the closure member 14 as generally known. When closed, a forward closure member seal 22 (FIG. 3) mounted along a closure member leading edge 14e of the closure member 14 preferably contacts a forward frame member 24 of the closure member frame 20. The forward frame member 24 is located along the leading edge of the opening 12 and under the vehicle roof R. It should be understood that various frame arrangements and closure member drive systems will benefit from the present invention.

The wind deflector assembly 18 is mounted to the closure member frame 20 downstream of the forward frame member 24 within the path of the closure member 14. The wind deflector assembly 18 includes a wind deflector frame member 26 mounted to the closure member frame 20 and a resilient member 28 mounted to the closure member frame 20. The resilient member 28 extends above the vehicle roof R when in the deployed position so as to operate as a wind deflector to deflect an airflow. It should be understood that the size and profile of the resilient member is related to the expected wind force and opening size.

The resilient member 28 preferably defines a profile of a hollow triangle in cross-section. That is, the resilient member includes a forward side 30a, an aft side 30b a tip 30t and a bottom side 30c. It should be understood that other profiles will also benefit from the present invention.

The bottom side 30c includes a multiple of clips 32 which engage the wind deflector frame member 26 to provide for replacement and/or maintenance of the resilient member 28 without the requirement of disassembling the frame 20. The clips 32 are integral and/or bonded to the resilient member 28 to preferably form a U-channel.

The resilient member 28 is manufactured of a flexible material such as rubber or closed cell foam. The material must be rigid enough to withstand expected wind force yet be flexible enough to collapse (FIG. 3) in response to contact with the closure member 14. The resilient member 18 advantageously deploys due to the flexibility of the material such that the free state of the formed resilient member 28 is the deployed condition.

Referring to FIG. 3, the resilient member 28 is in a collapsed position which occurs when a closure member leading edge 14e of the closure member 14 is closed over the resilient member 28. That is, operation of the closure member 12 collapses or folds over the resilient member 28 from the deployed free state (FIG. 2) to the collapsed state FIG. 3). The tip 30t of the resilient member 28 preferably contacts the forward closure member seal 22 to provide a seal therebetween. As the forward closure member seal 22 contact the resilient member 28, minimal wear is applied to the resilient member 28 during each closure cycle.

As no drive or pivot arrangements are required for the wind deflector assembly 18, a particularly thin sun-roof construction is possible.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A sunroof assembly comprising:
   a closure member frame;
   a closure member movable relative said closure member frame between an open and a closed position;
   a forward closure member seal extending from said closure member, said forward closure member seal engageable with said closure member frame; and
   a resilient member to deflect an airflow mounted to said closure member frame, said resilient member located along a closure path of said closure member such that a closure member leading edge of said closure member passes over said resilient member when said closure member moves to said closed position wherein said resilient member bends into contact with said forward closure member seal when said closure member is in said closed position.

2. The sunroof assembly as recited in claim 1, wherein said resilient member is substantially triangular in cross-section.

3. The sunroof assembly as recited in claim 1, wherein said resilient member is at least partially hollow.

4. The sunroof assembly as recited in claim 1, wherein said resilient member is bendable in response to contact with said closure member.

5. The sunroof assembly as recited in claim 1, wherein said resilient member is manufactured of rubber.

6. The sunroof assembly as recited in claim 1, wherein said resilient member is manufactured of a closed cell foam.

7. A method of deploying a wind deflector comprising the steps of:
   (1) locating a resilient member to deflect an airflow along a closure path of a closure member, the resilient member having a first configuration in a free state; and
   (2) moving a closure member leading edge over the resilient member and deforming the resilient member from the first configuration in response to contact with the closure member into contact with a forward closure member seal.

8. A method as recited in claim 7, wherein said step (1) further comprises locating the resilient member along the closure path adjacent a leading edge of a roof opening.

9. A method as recited in claim 7, wherein said step (2) further comprises bending the resilient member.

10. A method as recited in claim 7, further comprising the steps of:
    maintaining the closure member in a closed position over the resilient member to maintain the resilient member in a second configuration.

11. The sunroof assembly as recited in claim 1, wherein said resilient member bends to provide contact between a forward side and an aft side of said resilient member.

12. The method as recited in claim 7, wherein said step (2) further comprises bending the resilient member to provide contact between a forward side and an aft side of said resilient member.

13. A method of retracting a wind deflector comprising the steps of:
    (1) locating a resilient member to deflect an airflow along a closure path of a closure member, the resilient member having a substantially triangular cross-section in a free state;
    (2) moving a closure member leading edge over the resilient member along a closure path;
    (3) folding the resilient member in opposition to an airflow direction as the closure member passes completely over the resilient member as the closure member moves along the closure path; and
    (4) bending the resilient member into contact with a forward closure member seal mounted along the closure member.

14. A method of retracting a wind deflector comprising the steps of:
    (1) locating a resilient member to deflect an airflow along a closure path of a closure member, the resilient member having a substantially triangular cross-section in a free state;
    (2) moving a closure member leading edge over the resilient member along a closure path;
    (3) folding the resilient member in opposition to an airflow direction as the closure member passes completely over the resilient member as the closure member moves along the closure path; and
    (4) bending the resilient member such that a tip of the resilient member contacts a forward closure member seal mounted along the closure member.

* * * * *